3,301,801
ADMIXED COMPOSITION OF (1) COPOLYMER OF ACRYLIC ACIDS AND ESTERS THEREOF; (2) EPOXY COMPOUNDS; AND (3) DICYANDIAMIDE
Joseph E. Gaske, Argo, and Wallace H. Brown, Downers Grove, Ill., assignors to De Soto Chemical Coatings, Inc., Chicago, Ill., a corporation of Delaware
No Drawing. Filed June 8, 1965, Ser. No. 462,409
4 Claims. (Cl. 260—17)

The present application is a continuation-in-part of our prior pending application Serial No. 38,762, filed June 27, 1960, now abandoned, which, in turn, is a continuation-in-part of our prior application Serial No. 745,304, filed June 30, 1958, and now abandoned, but which was copending with said application Serial No. 38,762.

The present invention relates to the production of certain copolymers and final resins therefrom. In particular, it relates to the solution polymerization of acrylic monomers as hereinafter defined to a copolymerized product characterized by the ability to link with certain 1-2-epoxy compounds, and further characterized by the ability to be cross-linked through the agency of a polyepoxy compound.

U.S. Patents Nos. 2,604,464, 2,662,870 and 2,798,861 disclose solution copolymers of styrene, acrylic or methacrylic acid or both, and alkyl esters of one or both of said acids; and further disclose reaction products of such copolymers with diglycidyl ether of diphenylolpropane, to form coatings. We have discovered that improved film-forming coating compositions result from solution copolymers of acrylic compounds not involving styrene.

Styrene contributes hardness and brittleness to enamels and other coatings, the brittleness being undesirable for uses such as on household appliances. In such uses, styrene leads to poor adhesion to metal surfaces and also to poor exterior durability. Lack of exterior durability is evidenced by blisters and undercutting in salt-spray, humidity and weatherometer tests. Lack of adhesion is evidenced by creeping corrosion at the interface of the film coat and the metal. These disadvantages resulting from styrene are avoided by omitting styrene and by providing solution copolymers derived from monomers consisting of acrylic compounds in limited proportions as herein described. The copolymer of the present invention leads to film coats with better color retention, better gloss retention, and a durable combination of hardness, flexibility and adhesion.

It is, therefore, an object of the invention to produce improved solution copolymers and improved coating compositions derived therefrom.

The conduct of the process and the selection of raw materials may be varied greatly according to the properties desired for the copolymer, and for the linked or cross-linked resin. The preferred process is carried out to produce a copolymer which may exist in a volatile liquid vehicle codispersed with a polyepoxy compound and a cross-linking catalyst, with certain auxiliary agents and dispersed pigment, to be applied as a baking enamel, with desirable properties for the household appliance field.

The initial polymerization is an exothermic reaction and is carried out in a volatile liquid vehicle which preferably is a solvent for the factors and products of the reaction. Since the character of the preferred solution polymerization depends in part upon temperature, this condition is desirably fixed by carrying out the reaction under reflux conditions for the liquid vehicle at a fixed pressure, preferably atmospheric. In consequence, the preferred liquid vehicle is selected, not only for its solvent capacity, but for its atmospheric boiling point, to standardize the reaction and to control the generation of heat, and the factors for the reaction are slowly added to the solvent under arbitrarily prescribed conditions.

Acrylic monomers are employed, including at least one with a carboxylic acid group which is retained in the copolymer product for the purpose of linking with the epoxy compound. The acrylic monomers comprise acid and ester. The acid is selected from the group consisting of acrylic acid and alkyl substituted acrylic acid, such methacrylic acid which is readily and economically available. The ester is selected from the group consisting of alkyl esters of the acrylic acid above defined. The ester monomer may be a single compound or a mixture, the selection and the proportions depending upon the properties desired.

For example, in a film, such as hereinafter described, made by cross-linking the copolymers with that epoxy compound which corresponds to the reaction product of one mole of bisphenol A with two moles of epichlorohydrin, the properties are dependent upon the acrylic monomer employed.

The acid present in the acrylic monomers in amount of at least 3% and up to 20% provides copolymer with free carboxylic acid groups for reaction with epoxy groups. The acid produces hardness in the film, and methacrylic acid produces greater hardness than acrylic acid.

Acrylic ester imparts resistance against acids and alkalies and good weathering resistance, and the ester choice is otherwise important. Ethyl acrylate imparts flexibility and softness. Methyl methacrylate imparts hardness.

Ethyl methacrylate alone as the acrylic ester gives excellent results. Another acrylic ester combination consists of 2-ethyl-hexyl acrylate, ethyl acrylate and methyl methacrylate. Thus, in general, hardness derives from methacrylate acid and its esters, whereas the acrylic acid ester leads to softer and more flexible films. Variously mixing acrylic-type esters gives a wide control of the characteristics of the final resin.

The copolymerization takes place through the mechanism of free radicals and for that purpose anyone of numerous free-radical initiators is used, benzoyl peroxide being preferred. The conventionally used free-radical initiators are organic peroxides, but non-peroxides are known, such as N,N-azodiisobutyronitrile, known in the trade as "Porofor N" a trade-marked product of Westville Laboratories, Monroe Center, Connecticut.

Free-radical initiators are selected to function at certain temperature ranges, and many are available and well known.

The choice of peroxide is in part determined by its decomposition temperature as related to the temperature prevailing during the copolymerization. Benzoyl peroxide catalyzes at 60° C. and above, which temperature gives excellent results when the liquid vehicle is xylene refluxing at atmospheric pressure.

Xylene, which refluxes at 137° to 143° C. is suitable for solution polymerization with benzoyl peroxide. A desirable degree of polymerization is achieved when a mixture of selected monomers and the initiator is added to the refluxing xylene. A procedure is exemplified as follows:

*Example 1.—Polymerization of acrylic monomers*

| | Parts by weight |
|---|---|
| Methyl methacrylate | 45 |
| Eethyl acrylate | 45 |
| Methacrylic acid | 10 |
| Benzoyl peroxide | 1 |
| Xylene | 54.3 |

The reaction vessel equipped with reflux condenser is completely purged of air by introducing nitrogen. The xylene is introduced and heated to reflux temperature while continuing the purging and agitating the xylene. Separately, the monomers are mixed and then the benzoyl peroxide is added to the monomer mixture for convenience in introducing the materials simultaneously at the same rate. When the xylene has reached its reflux temperature the reagents are slowly added through a control valve during a predetermined time period, arbitrarily selected for a standardized procedure, as 2¾ hours, followed for an additional refluxing time to a total of 7 hours. Then the mass is cooled resulting in a cloudy dispersion of acrylic copolymer, which is one component for a final resin-forming composition.

The copolymer retains the carboxylic acid group as the functional group for resin formation by linking with an epoxide group.

The epoxide group reacts with the carboxylic acid group, usually under catalysis and with applied heat, thus linking the epoxide-containing molecule to the acrylic copolymer containing the carboxylic acid group.

When the acrylic copolymer of the present invention is so linked, a resin is finalized. However, a more durable and valuable resin results when a resin of greater molecular weight is formed by cross-linking one copolymer with another or several others, through the agency of an epoxy compound having two or more of such epoxide groups.

One suitable polyepoxy compound for such purpose is the condensation reaction product of two moles of epichlorohydrin with one mole of diphenylolpropane (hereinafter referred to as bisphenol A), also identified as 2-2-bis(para-hydroxyphenyl)propane. The latter contains a single 1-2-epoxy group, and two such groups become attached to the bisphenol nucleus by the following ether-forming reaction:

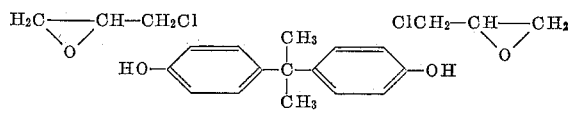

The resulting diglycidyl phenolic ether herein designated as Epoxy No. 1, is a liquid having the following properties:

| | |
|---|---|
| Melting point, ° C. | 8–12 |
| Color (Gardner), maximum | 12 |
| Viscosity (Gardner-Holdt) | Z5–Z5+ |
| Epoxide equivalent [1] | 190 to 210 |

[1] Grams of resin containing one gram-equivalent or gram-mole of epoxide.

The above described diepoxy compound is the simplest form of what is known as diglycidyl ether of bisphenol A. It has the property of linear polymerization with more epichlorohydrin and bisphenol A by a reaction between the terminal epoxide group and the phenolic group, as follows:

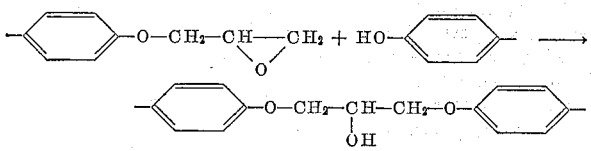

so that polymers with terminal epoxy groups and internal hydroxyl groups, with more than one bisphenol A nucleus are formed. Such epoxide compounds may be used for cross-linking in the present invention, but as the molecular weight increases the epoxide equivalent increases and the epoxide value decreases, with resins of different properties resulting.

Although Epoxy No. 1 is termed diglycidyl ether of bisphenol A and is characterized as having an epoxy equivalent of 190 to 210, this variation results from a variable content of the products of linear polymerization. In commercially reacting bisphenol A with epichlorohydrin under conditions directed to the formation of the primary product diglycidyl ether with only bisphenol A nucleus, there is side reaction involving some of the primary product with some of the epichlorohydrin, whereby to vary the epoxide equivalent of the final product. As a result, the identified Epoxy No. 1 is in reality a mixture containing a small amount of linear polymer, with the result that the epoxy equivalent is elevated from the theoretical value of 170 for diglycidyl ether of bisphenol A.

The acrylic copolymers of the present invention may be variously combined with the epoxide-containing reagent and a catalyst, with or without volatile liquid vehicle present as a complete solvent, partial solvent, or non-solvent. However, where the composition to form the resin is applied as a coating composition, a volatile liquid vehicle is employed in which some or all of the ingredients may be either dissolved or readily dispersed. In the case of enamels, the pigment is dispersed and preferably the resin-forming reagents are dissolved.

For preparing coating compositions, it is preferred to include as a component thereof the copolymerization mass comprising the liquid vehicle and acrylic monomers, such as the liquid mass of Example 1.

Preferably, the solution of copolymer from Example 1, which is cloudy, is clarified by adding a true solvent for the copolymer content of a coating solution, such as ethanol. To this is also added the selected epoxy compound and catalyst. There are auxiliary agents which may be present for special effects which are not essential for, or which do not participate in, the reactions at curing temperatures.

Among the useful catalysts are tertiary amines such as dimethyl fatty amines, fatty quaternary amines, 2,4,6-tri(dimethylaminomethyl) phenol, potassium hydroxide, quaternary amine hydrochlorides, dicyandiamide, morpholine, n-methyl morpholine, n-ethyl morpholine, morpholine fatty acid soaps, di-methyl p-toluidine, tri-lauryl amine, and "pip-pip" (piperidine N-pentamethylene-dithiocarbamate). All of the foregoing except dicyandiamide rapidly promote curing at 130° F., whereas dicyandiamide does not function rapidly until higher temperatures are reached, as explained hereinafter. Those functioning rapidly at lower temperatures lower the storage-life of compositions containing them and for preferred compositions are less desirable than dicyandiamide. When enamels are preferred, the catalyst is preferably incorporated with the pigment. Other catalysts are hydrazides such as stearic hydrazide, urea resins and melamine resins.

Auxiliary agents may vary. Cellulose acetate butyrate of ½-second viscosity when present in an enamel functions to eliminate cratering and crawling and to inhibit thermal flow during baking. A preferred one is characterized as follows:

| | Percent |
|---|---|
| Combined cellulose residue | 50 |
| Free hydroxyl in residue | 2 |
| Combined with butyryl | 37 |
| Combined with acetyl | 13 |

Waxy materials are used as auxiliary agents because after baking they impart slip and mar resistance. However, care must be exercised to select materials which will not impair inter-coat adhesion when a second coat is applied. The waxy material employed is one soluble or dispersible in the coating composition. Blends of waxy hydrocarbons, are preferred. The waxy material is preferably incorporated into enamels along with the pigment. Suitable waxy substances are—

Petrolatum:
| | |
|---|---|
| Specific gravity | 0.865 |
| Viscosity (210° F.) | 53–57 |
| Penetration (70° F.) | 220–250 |
| Flash point, ° F. | 410 |
| Melting point, ° F. | 110–114 |
| Color | Pale |

Polyethylene wax:
| | |
|---|---|
| Melting point, ° F. | 184–195 |
| Acid Value | 0 |
| Saponification Value | 0 |
| Color | Light yellow |

A suitable waxy blend W to be added to an enamel along with the pigment, which does not yield a greasy coat, is one having 5 parts of petrolatum and 3 parts of said polyethylene wax.

The following Example 2 relates back to Example 1. Rather than cooling the finished copolymer solution to room temperature, it is partially cooled for conversion to a resin-forming coating composition.

*Example 2*

The hot reflux solution of Example 1 is cooled to 94° C., and to it is added a mixture of the diglycidyl phenolic ether above described, ethanol and xylene, which lowers the temperature further. When thoroughly mixed, the optional cellulose acetate butyrate is added, and if necessary to dissolve it, the mass is raised to the reflux temperature of about 90° to 95° C., for about 5 minutes. Then, the mass is filtered through a suitable paper filter, preferably after cooling.

For the components, as given in Example 1, the additional materials are:

| | Parts by weight |
|---|---|
| Ethanol | 11.0 |
| Xylene | 8.7 |
| Cellulose acetate butyrate | 0.6 |
| Liquid diglycidyl ether of bisphenol A | 21.7 |

The foregoing is a solution useful as a clear coating composition and useable as the liquid vehicle of an enamel composition, such as in Example 3. By incorporating a white titanium dioxide pigment and catalyst, with or without a waxy component, a white baking enamel is formed suitable for kitchen appliances. When a catalyst is desired for a clear film or for an enamel, 0.21 part of dicyandiamide may be present for curing at 325° F. in 20 minutes.

*Example 3.—White baking enamel*

A high grade commercial titanium dioxide is dispersed to a particle fineness such that there are none over 10 microns in size. Tints may be produced by adding a content of a suitable colored pigment at the same time, or by mixing into an untinted finished enamel composition a small but tinting quantity of a colored pigment dispersed in a solution containing an additional but small amount of the formula resin.

The volatile content resulting from use of the solution from Example 2 is preferably supplemented to arrive at a composition as follows—

| Non-volatile content | Percent |
|---|---|
| Pigment | 30.00 |
| Organic content (Ex. 2) | 30.00 |
| Dicyandiamide | .21 |
| Wax blend W | .15 |
| | 60.36 |

| Volatile content | Percent |
|---|---|
| Ethanol | 10.84 |
| Xylene | 18.55 |
| Butanol | 4.00 |
| Methyl isobutyl carbinol | 6.25 |
| | 39.64 |

The butanol aids in the formation of a level film. The methyl isobutyl carbinol is a poor solvent for the resin components and remains in the highest concentration after most of the other and faster evaporating volatile content is lost. Its late retention aids in prevention of crawling and cratering of the wet film.

The resulting enamel composition may be thinned with a selected solvent for application. For example, for spraying, 4 volumes of the enamel may be thinned with 1 volume of xylene. In place of xylene, a more active solvent may be selected, one such being ethylene glycol monobutyl ether, which may be used alone or mixed, as for example, 1 volume with 4 volumes of xylene.

A sprayed film of the formulation of Example 3, thinned with ¼ volume of xylene readily bakes to a dry film of 1.0 to 1.5 mil thickness.

Baking at 325° F. (163° C.) may be effected in 20 minutes, and at 350° F. (177° C.) in 15 minutes. At lower temperatures, longer time is required, for example 30 minutes at 300° F. (149° C.).

Such a film baked at 325° F. is characterized as follows:

| | |
|---|---|
| 60° gloss | 90–95. |
| Pencil hardness | 4H. |
| Adhesion (to bare steel or "Bonderized" steel) | Excellent. |
| Mar resistance | Excellent. |
| Impact resistance | 40-inch pounds reverse on 20 gauge metal. |
| Bend test | Passes 180° bend over a mandrel of ⅛ inch diameter. |
| Chemical resistance | (See below.) |

The film is not damaged or altered in any way after exposure for 24 hours to aqueous solutions, as follows:

| | Percent |
|---|---|
| Sulfuric acid | 10 |
| Citric acid | 10 |
| Lactic acid | 5 |
| Caustic soda | 5 |

When the film is tested for staining by materials such as coffee, lemon juice, lipstick, mustard, vinegar, floor wax and hot kitchen fats, these agents are readily removed by soap and water without damage to the film.

The film is not appreciably softened and does not lose gloss or image reflection when immersed in a 1% solution of a modern laundry detergent for 200 hours at 74° C.

When a typical film such as that from Example 3 is exposed in a weatherometer to a carbon arc and water for 1000 hours, the film changes only slightly in its 60° gloss character (from 85 to 77).

The invention is not limited to using the copolymers of Example 1. A wide variety of mixtures may be made so long as acrylic ester is present with acrylic acid or alkyl substituted acrylic acid. The following examples illustrate substitute formulations for the acrylic-components of Example 1.

*Example 4*

| | |
|---|---|
| Methyl methacrylate | 45 |
| Ethyl acrylate | 45 |
| Acrylic acid | 10 |

Examples 5 and 6

|  | (5) | (6) |
|---|---|---|
| Methyl methacrylate | 45 | 45 |
| Ethyl acrylate | 35 | 25 |
| 2-ethyl-hexyl acrylate | 10 | 20 |
| Methacrylic acid | 10 | 10 |

Example 7

| | |
|---|---|
| 2-ethyl-hexyl acrylate | 90 |
| Methacrylic acid | 10 |

Example 8

| | |
|---|---|
| Ethyl methacrylate | 90 |
| Methacrylic acid | 10 |

Example 9

| | |
|---|---|
| Ethyl acrylate | 90 |
| Methacrylic acid | 10 |

In the various polymerizations by the procedure of Example 1, the benzoyl peroxide may be varied from 0.5 to 2 parts with little noticeable effect on the polymer product.

The following tabulation shows additional modifications.

| Example | 21 | 22 | 23 | 24 | 25 | 26 | 27 | 28 |
|---|---|---|---|---|---|---|---|---|
| Solids of copolymer of Example 1, Parts by Weight | 95 | 90 | 80 | 75 | 82.2 | 100 | 100 | 100 |
| Epoxy No. 1 (Epoxide equivalent 190-210), Parts by Weight | 5 | 10 | 20 | 25 | 17.8 | 22 | 17.8 | 33.4 |
| Range of Percent Excess of Epoxy No. 1 |  |  | 2.56–13.3 | 36.6–51.1 |  |  |  | 36.9–51.1 |
| Range of Percent deficiency of Epoxy No. 1 | 76.2–78.5 | 54.2–49.7 |  |  | 2.2–11.5 | 0–9.84 | 20.4–27.9 |  |
| Impact Resistance (reverse in inch-pounds) | 5 | 15 | 50 | 25 | 55 |  |  |  |

|  | Parts by Weight ||||| 
|---|---|---|---|---|---|
| Example | 10 | 11 | 12 | 13 | 14 |
| Methacrylic acid | 20 | 10 | 5 | 15 | 3 |
| Methyl methacrylate | 50 | 50 | 50 | 35 | 52 |
| Methyl acrylate |  |  | 10 |  |  |
| Ethyl acrylate |  |  |  | 45 | 50 | 45 |
| Butyl acrylate | 30 | 30 |  |  |  |

It is to be understood that the characteristics of the final resin vary with the various acrylic copolymers, including those exemplified above, and also with the epoxy compound. Suitable epoxy compounds which may be used in place of or in combination with the one given in Example 3 are:

*Epoxy No. 1ª.*—The linear polymers of Epoxy No. 1.

In compounding acrylic copolymer, or any mixture thereof and epoxy compound, the properties for stoichiometrical reaction are readily calculated from the epoxide equivalents, to conform to a reaction between one carboxylic acid group and one epoxide group.

Example 15.—Clear film

Example 2 was modified by using 58 parts of a second form of Epoxy No. 1ª having a molecular weight of 900 and an epoxide equivalent of 500. The resulting clear film had slightly better resistance to salt spray than the film of Example 2.

As additional examples of copolymerization with other catalysts, the following are given:

|  | Parts by Weight |||||
|---|---|---|---|---|---|
| Example | 16 | 17 | 18 | 19 | 20 |
| Methacrylic acid | 10 | 10 | 10 | 10 | 10 |
| Acrylic acid |  |  |  |  | 10 |
| Methyl methacrylate | 45 | 45 | 45 | 45 | 45 |
| Ethyl acrylate | 45 | 45 | 45 | 25 | 25 |
| 2-ethyl-hexyl acrylate/di-tertiary-butyl peroxide |  |  |  | 20 | 20 |
| Lauroyl peroxide | 1 |  |  | 1 | 1 |
| N,N,azodiisobutyronitrile |  | 1 |  |  |  |
|  |  |  | 1 |  |  |

All the foregoing were carried out as in Example 1, using 66.7 parts of xylene as solvent, and all resulted in clear solutions. As well known in the art, small amounts of various polymerization chain-transfer agents may be present, for example, 0.6 part of n-dodecyl mercaptan in Example 26.

Since epoxy compounds may cross-link with themselves, it is possible to have an excess of the epoxy compound over the stoichiometric amount for reaction with the carboxylic acid group in the acrylic copolymer. However, less than said stoichiometric amount may be used.

The epoxy compounds to which the invention is particularly directed are polyglycidyl ethers of diphenylol compounds.

By providing epoxide groups for all of the carboxylic acid groups, the reactivity of the latter in the final resin to alkali and alkaline detergents is blocked, thus yielding resins and enamels suitable for kitchen appliances, for example.

The excess or deficiency of epoxy compound for interaction with the carboxylic acid groups is indicated by the following examples:

Examples 21 through 28 were cured with .21 part of dicyandiamide at 325° F., in 20 minutes, as films on black iron sheets. The coated sheets of Examples 21 through 28 were tested for impact resistance as tabulated. The films of Examples 26, 27 and 28 were approximately equal in quality. The series shows a range from 51.1% excess of epoxy compound to 78.5% deficiency thereof.

It should be noted that when liquid coating materials are cast in film form, commercial practicability dictates that a cure (reaction of carboxy with glycidyl ether groups) must take place to result in an insoluble, infusible film. This must generally take place within a time period of 20 minutes on production line facilities of appliance manufacturers in an oven at 325° F. air temperature. It has been found that the reaction which achieves this "cure" must be catalyzed in order to meet this requirement. In the investigation of possible catalysts which could be used in small quantities, other factors equally as important as the cure characteristics became evident. Three criteria are used to adjudge the practicality of the catalysts, these being:

(1) Commercially practical storage times of liquid coating materials are about 3 to 6 months in sealed containers under normal atmospheric conditions. During this period, the small catalytic quantities of these agents must not cause flocculation of suspended pigment, nor must there be any evidence of loss of gloss of films cast from these liquids after this storage period. Further, the agents must not have color producing properties which would cause even very slight yellowing in white films or in no other way adversely affect the obvious physical properties needed in the coating industry.

(2) The catalyst must not promote chemical reaction in the liquid phase during storage which causes a prohibitive increase in viscosity due to reaction of carboxy-containing polymer and glycidyl ether-containing resin. This reaction leads to eventual gellation. Additionally, the catalyst must not promote reaction of glycidyl ether groups with hydroxy groups which may be present as an alcohol solvent. This latter reaction does not cause an increase in viscosity of the liquid coating material, but there is a loss of chemical resistance and poorer physical properties of films formed from this material after storage. There must be no reaction of the catalyst with metals which may be encountered in commercial production equipment, storage containers or tanks, or transport tanks (metals such as steels, zinc, or copper).

(3) The catalyst must be capable of promoting "cure" in films having a dry film thickness of about 1.2 mils within the prescribed 20 minutes at 325° F. This is evaluated by casting films on 4" x 12" 20 gauge steel panels and heating in an indirectly heated laboratory oven set at an air temperature of 325° F. for 20 minutes.

With these criteria in mind, a series of baking enamels were formulated as detailed hereinafter to include various proportions of dicyandiamide as tabulated hereinafter and films were cast onto 20 gauge zinc phosphated steel (Parker Rustproof Co.'s Bonderite 100 treated) panels using a 0.003" Bird film applicator. These were baked for 20 minutes in a laboratory oven with a 325° F. air temperature. The resultant films were evaluated as indicated in the tabulation set forth hereinafter. The coating liquids with catalysts added were stored in sealed glass jars for further evaluation. One series of jars was stored at room temperature, the other series was exposed to heat of 130° F. These coatings in liquid form were observed during storage and observations tabulated.

The baking enamel in which the various proportions of dicyandiamide were incorporated is as follows:

*Example 29*

| Resin solution: | Parts by weight |
|---|---|
| Resin solids of Example 19 | 100 |
| Epoxy No. 1 | 21.7 |
| Xylene | 63.0 |
| Ethanol | 11.0 |

The results obtained by incorporating dicyandiamide in various weight proportions and then baking at 325° F. for 20 minutes are set forth in the following tabulation.

It is concluded that dicyandiamide proportions based on polyglycidyl ether-acrylic carboxylic copolymer are preferably about 0.7%, and desirably in the range of from 0.5% to 0.9% by weight, based on the total weight of resin solids.

The invention is defined in the claims which follow.

We claim:

1. A coating composition comprising an organic solvent solution containing a solution copolymer of from 3 to 20 parts of acid selected from the group consisting of acrylic acid, methacrylic acid and mixtures of said acids, and correspondingly, from 97 to 80 parts of alkyl esters of said acids in which the alkyl radical of said esters contains from 1 to 8 carbon atoms, epoxy compound in an amount providing from 21.5 to 151 1,2-epoxy groups per 100 carboxylic acid groups of said solution copolymer, said epoxy compound being a polyglycidyl ether of diphenylol compound, and dicyandiamide in an amount of from 0.5 to 0.9% by weight, based on the total weight of resin solids, to promote reaction between said solution copolymer and said epoxy compound when said solution is baked.

2. A coating composition as recited in claim 1 in which said solution includes cellulose acetate butyrate.

3. A coating composition as recited in claim 1 in which said solution further includes butanol.

4. A coating composition as recited in claim 1 in which said solution includes methyl isobutyl carbinol.

| Dicyandiamide (Concentration Based on Solid Resin) | Initial Film Properties | | | | Observation of Stored Liquid in Glass Jars | | |
|---|---|---|---|---|---|---|---|
| | Appearance of Film | Pencil Hardness | Reverse Impact (in.=lbs.) | Acetone Resistance (20″ test) | Initial Appearance | Stability, Room Temp. | Stability at 130° F. |
| 1.2% | High gloss white | 3H | 20 | V. slight softening | No separation | Visc. increase 30 days at room temperature | 100 hrs. at 130° F. |
| 1.0% | do | 3H | 20 | do | do | Sl. visc. increase 30 days. | Viscosity increase at 100 hrs. |
| 0.7% | do | 2H | 20 | do | do | No change 30 days. | Sl. visc. increase 100 hrs. |
| 0.5% | do | H-2H | 15 | Slight softening | do | do | V. sl. visc. increase 100 hrs. |
| 0.1% | do | F | 15 | Severe softening | do | do | No change. |
| 0.0% (Control) (no catalyst). | do | HB | 1 5 | Dissolved | do | No change | Do. |

[1] Fails.

References Cited by the Examiner

UNITED STATES PATENTS 2,872,427  2/1959  Schroeder _____ 260—29.6
2,879,235  3/1959  Condo _____ 260—13

FOREIGN PATENTS 145,724  3/1952  Australia.

SAMUEL H. BLECH, *Primary Examiner.*

WILLIAM H. SHORT, *Examiner.*

J. NORRIS, *Assistant Examiner.*